US006542244B1

(12) United States Patent
Rumpf et al.

(10) Patent No.: US 6,542,244 B1
(45) Date of Patent: Apr. 1, 2003

(54) VARIABLE SENSITIVITY ACOUSTIC TRANSDUCER

(75) Inventors: Raymond C. Rumpf, Melbourne, FL (US); Charles M. Newton, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/456,739

(22) Filed: Dec. 7, 1999

(51) Int. Cl.[7] .................................................. G01B 9/02
(52) U.S. Cl. ........................ 356/477; 356/478; 367/140
(58) Field of Search ................................ 356/477, 478; 385/12

(56) References Cited

U.S. PATENT DOCUMENTS 5,574,699 A * 11/1996 Cuomo ....................... 367/149
5,867,258 A * 2/1999 Frederick et al. ........... 356/480

* cited by examiner

*Primary Examiner*—Frank G. Font
*Assistant Examiner*—Phil Natividad

(74) *Attorney, Agent, or Firm*—Allen, Dyer, Doppelt Milbrath & Gilchrist, P.A.

(57) ABSTRACT

The gauge length of an acoustic signal detector is dynamically variable by adjusting the location of an induced light reflection interface within a section of optical waveguide to which an acoustic stimulus is coupled. In an interferometer based architecture, a light beam is applied to each of an 'acoustic signal detection' optical waveguide and a 'reference' optical waveguide. The 'acoustic signal detection' waveguide is coupled to an acoustic energy transmission element. The acoustic input modifies the index of refraction of the optical waveguide and modulates the light passing through the waveguide. Since the index of refraction of the optical waveguide section is modified by the acoustic stimulus, the signal beam has a phase delay dependent upon the acoustic signal and the distance between one end of the signal waveguide section and an induced reflection interface. The 'reference' optical waveguide section also contains a reflection interface, the induced location of which is ganged with that of the signal optical waveguide section. The 'signal' path and 'reference' path beams reflected by their reflection interfaces are combined and applied to a photo-detector. The index of refraction of the material of the signal optical waveguide section is modified by the acoustic stimulus is the 'signal path'. This 'signal' path light beam is combined out of phase with 'reference' light beam at the photo-detector.

19 Claims, 2 Drawing Sheets

VARIABLE SENSITIVITY ACOUSTIC TRANSDUCER

FIELD OF THE INVENTION

The present invention relates in general to signal detection and analysis systems and components therefor, and is particularly directed to a new and improved acoustic signal detector, such as may be employed in a hydrophone and the like, having an acoustic stimulus sensitivity characteristic that is controllably variable by adjusting the gauge length of optical waveguide forming the sensor.

BACKGROUND OF THE INVENTION

The accurate detection and measurement of signals emanating from one or more remote or local sources, such as but not limited to acoustic energy sources, are fundamental requirements of a variety of industrial, military, and scientific systems. Because characteristics of the signals being measured not only typically vary among different applications, but may manifest substantial changes for a given application, the system designer is typically faced with having to trade off between sensitivity and dynamic range, when choosing a transducer/sensor.

Attempts to solve this problem have included coupling the output of the sensor to a variable gain amplifier, and adjusting the amplifier gain in accordance with the expected characteristics of the signal being monitored. An obvious deficiency to this approach is the fact that controlling the operation of downstream electronics will not vary the sensitivity of the upstream sensor. In addition, this scheme is noisy at higher gains and the sensitivity range is narrower. Another technique has been to multiplex the outputs of a plurality of different sensitivity transducers. Not only does this increase hardware, signal processing complexity and cost, but compromises the required location of the sensor.

SUMMARY OF THE INVENTION

In accordance with the present invention, these shortcomings of conventional fixed and pseudo variable sensitivity (acoustic) sensor architectures are successfully addressed by an acoustic signal detector having a variable sensitivity characteristic, in particular a variable gauge length, that is controllably and dynamically modified by adjusting the location of a light reflection interface within a section of optical waveguide to which the acoustic stimulus to be sensed is applied. By changing the position of the light reflection interface to increase the gauge length, the distance over which the refractive index of the waveguide is changed as a result the acoustic stimulus is increased, making the sensor more sensitive to small amplitude signals. By decreasing the distance over which the refractive index of the waveguide is affected by the acoustic stimulus, the gauge length and sensitivity of the sensor is decreased, so as to tune the sensor's sensitivity to large amplitude signals.

In a preferred embodiment, the variable gauge length sensor of the invention is configured as an interferometer-based architecture. A light beam such that generated by a laser is applied via an optical waveguide coupler to each of an 'acoustic signal detection' section of optical waveguide and a 'reference' section of optical waveguide. The coupler also has an output port coupled to a photodetector.

The 'acoustic signal detection' section of optical waveguide is coupled to an acoustic energy transmission element through which an input acoustic stimulus to be measured/sensed is impressed upon the signal waveguide section, and thereby modifies the index of refraction of the optical waveguide material, modulating the light passing through the waveguide in accordance with the acoustic signal. The gauge length of the 'acoustic signal detection' section of optical waveguide is defined by the displacement of a reflection interface from the waveguide coupler. The greater the displacement, the longer the two-way 'signal' travel path of the light beam through the acoustic stimulus-receiving optical waveguide section from the coupler to the reflection interface and back. Since the index of refraction of the optical waveguide section is modified by the acoustic stimulus, the signal beam will undergo a phase delay that is dependent upon the amplitude of the acoustic signal being measured and the gauge length through the signal waveguide section.

The 'reference' optical waveguide section also contains a reflection interface, the position of which is ganged with the reflection interface of the signal optical waveguide section. This results in a two-way travel path of the 'reference' light beam, through the reference optical waveguide section from the coupler to its reflection interface and back, being the same beam travel distance as the signal beam in the signal optical waveguide section. The two 'signal' path and 'reference' path beams are respectively reflected back into the coupler by their reflection interfaces and are combined at the output port of the coupler and applied to the photo detector. The index of refraction of the material of the signal optical waveguide section is modified by the acoustic stimulus is the 'signal path'. This 'signal' path light beam is combined out of phase with 'reference' light beam at the detector.

Non-limiting examples of mechanisms for controllably varying the locations of the respective reflection interfaces along the signal and reference waveguide sections include physically displaceable mirrors and electro-thermally driven strips. The mirrors are controllably positionable in the signal and reference light beam travel paths through associated cascaded sections of optical waveguide. Through electromagnetic solenoid drivers, selected ganged pairs of mirrors may be controllably positioned within the signal and reference beam travel paths, so as to incrementally or stepwise change the gauge length of the sensor. Similarly, supplying electrical current to selected ganged pairs of the thermal strips induces reflection interfaces in the beam travel paths through signal and reference waveguide sections and thereby incrementally or stepwise changes the gauge length of the acoustic sensor.

DETAILED DESCRIPTION

As pointed out above, in order to make its sensitivity to acoustic signals dynamically variable, the sensor/transducer of the present invention employs a waveguide configuration having a controllably positionable light reflection interface. The location of this light reflection interface establishes the gauge length of that portion of the waveguide to which the acoustic signal to be sensed is coupled. By changing the position of the light reflection interface so as to increase the gauge length, and thereby the distance over which the refractive index of the waveguide is subject to be influenced by the acoustic stimulus, the sensitivity of the sensor is increased. Conversely, by changing the position of the light reflection interface so as to decrease the distance over which the refractive index of the waveguide is subject to being affected by the acoustic stimulus, the gauge length and sensitivity of the sensor is correspondingly decreased.

Figure 1:
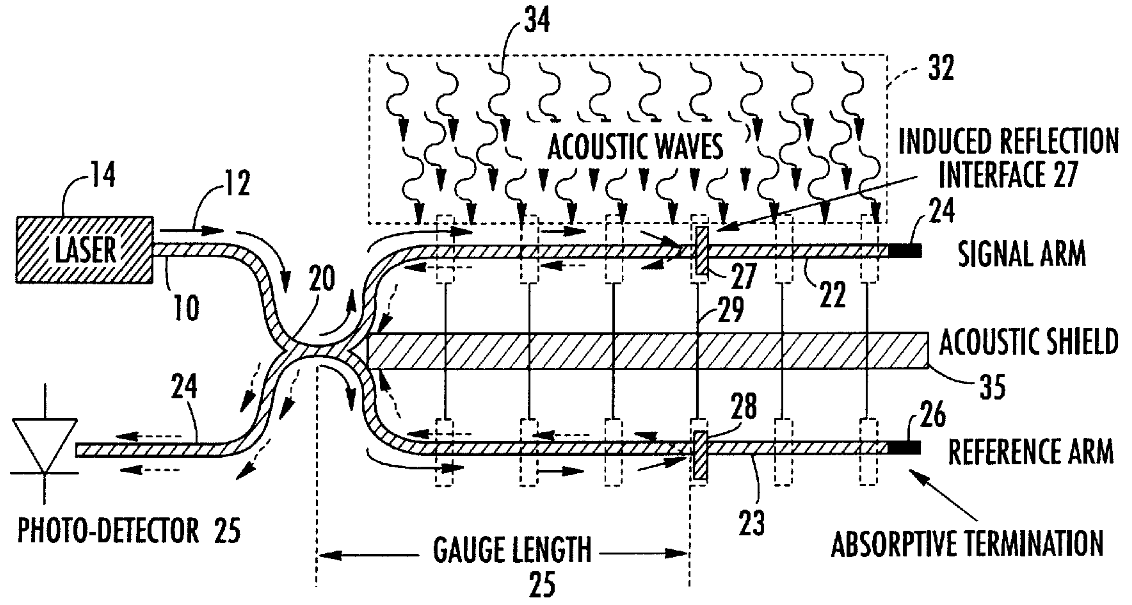
FIG. 1 diagrammatically illustrates an interferometric architecture of a variable gauge length acousto-optic sensor of the invention.

FIG. 1 is a diagrammatic illustration of a (Michelson) interferometer based architecture of a variable gauge length sensor of the invention, as comprising a first section of optical waveguide (fiber/light pipe) 10, into which a light beam 12 emitted by a source, such as a laser 14, is transmitted. The first or input section of light pipe 10 is joined by means of an optical waveguide coupler 20 to a second 'acoustic signal detection' section or arm of optical waveguide 22 and to third 'reference' section or arm of optical waveguide 23. The two optical waveguide arms are shown as terminated by light absorbing terminations 24 and 26, respectively. In addition, the optical waveguide coupler 20 has an output port joined to an output section of optical waveguide 21, which is coupled to a photo-detector 25.

The 'acoustic signal detection' optical waveguide section 22, which may be supported by and stabilized against a rigid substrate (not shown in FIG. 1), is coupled to an acoustic energy transmission element or medium 32, through which an input acoustic stimulus to be measured/sensed, shown as acoustic waves 34, is imparted to waveguide section 22. As non-limiting examples, the acoustic energy transmission element may comprise a compressional wave coupling element or a shear wave coupling element, which is configured to impress the acoustic energy to be measured into a 'gauge length' portion 25 of the signal arm 22 of the pair of optical waveguide sections. This, in turn, causes a modification of the index of refraction of the signal arm optical waveguide material and thereby modulates the light passing through the waveguide. Also shown in FIG. 1 is an optional acoustic shield 35, such as an acoustic absorber element, which serves to prevent energy within the monitored acoustic stimulus applied to the waveguide section 22 from being coupled to the reference waveguide section 23.

As pointed out above, where the distance along the waveguide to which the acoustic stimulus is applied is relatively long, the light beam traveling through the waveguide will encounter a longer travel path through material whose index of refraction is subject to change. This enables relatively weak (low amplitude) acoustic signals that are applied to the optical waveguide over a longer path (longer gauge length) to achieve substantially the same influence or modulation of the light beam as relatively strong (large amplitude) acoustic signals, that are applied to the optical waveguide over a relative short travel path (shorter gauge length).

The gauge length 25 of the 'acoustic signal detection' section of optical waveguide 22 is defined by the displacement of a reflection interface 27 from the waveguide coupler 20. The greater the displacement, the longer the two-way 'signal' travel path of the light beam through the acoustic stimulus-receiving optical waveguide section 22 from the coupler 20 to reflection interface 27 and back. Since the index of refraction of the optical waveguide section 22 is modified by the acoustic stimulus, the signal beam will undergo a phase delay dependent upon the acoustic signal being measured, as well as the gauge length through waveguide section 22.

The third 'reference' section of optical waveguide 23 also contains a reflection interface 28, the position of which is ganged with the reflection interface 27 of the signal optical waveguide section 22, as shown by coupling 29. This results in a two-way travel path of the 'reference' light beam, through the reference optical waveguide section 23 from the coupler 20 to reflection interface 28 and back, being the same beam travel distance as the signal beam in optical waveguide section 22.

The two 'signal' path and 'reference' path beams that are respectively reflected back into the coupler 20 by the reflection interfaces 27 and 28 are combined at the output port of the coupler 20 into the optical waveguide 24, and applied thereby to the detector 25. The index of refraction of the material of the signal optical waveguide section 22 is modified by the acoustic stimulus is the 'signal path'. This 'signal' path light beam is combined out of phase with 'reference' light beam at the photo-detector 25.

Figure 2:
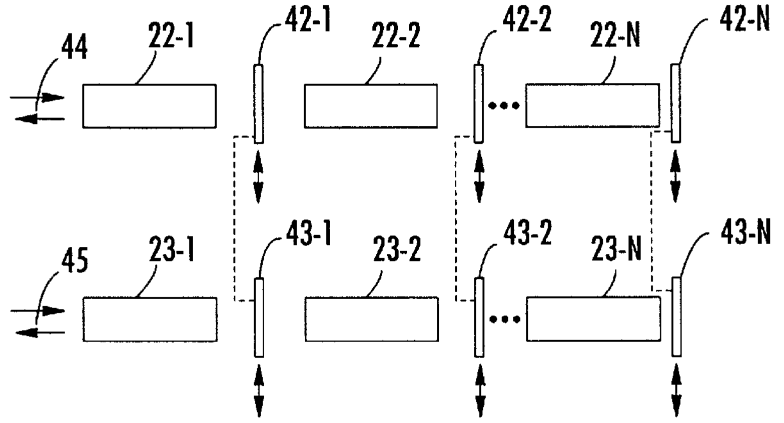
FIG. 2 shows a series of physically displaceable mirrors controllably positionable in respective signal and reference light beam travel paths of cascaded sections of optical waveguide.
Figure 3:
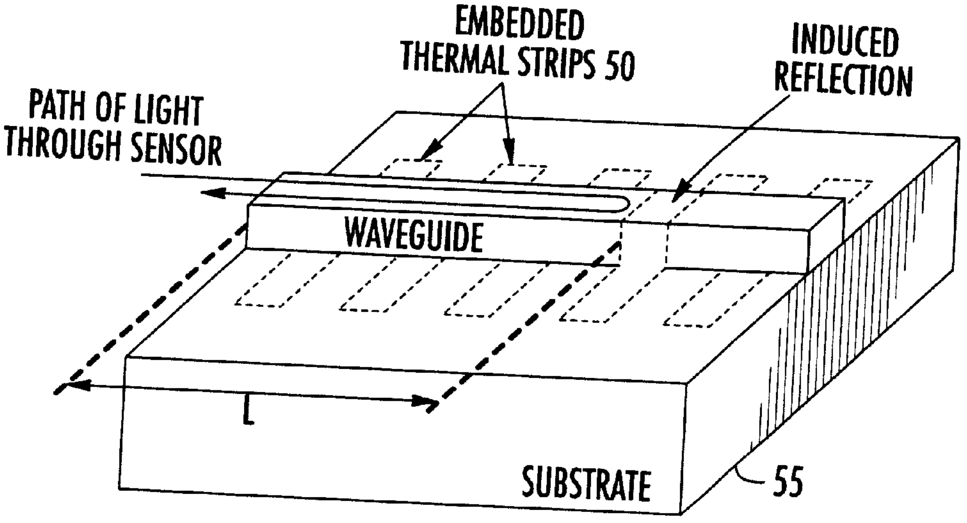
FIG. 3 diagrammatically illustrates an electro-thermal mechanism for controllably varying the location of an induced light reflection interface along a section of optical waveguide.

Non-limiting examples of mechanisms for controllably varying the locations of the respective reflection interfaces 27 and 28 along the waveguide sections 22 and 23 are diagrammatically illustrated in FIGS. 2 and 3. In particular, FIG. 2 shows a first series of physically displaceable mirrors 42-1, 42-2, . . . , 42-N, that are controllably positionable in a signal light beam travel 44 path through cascaded sections of optical waveguide 22-1, 22-2, . . . , 22-N that form the signal optical waveguide section. The signal beam travel path 44.

Similarly, a second series of physically displaceable mirrors 43-1, 43-2, . . . , 43-N are ganged with mirrors 43 and controllably positionable in a reference light beam travel path 45 through cascaded sections of optical waveguide 23-1, 23-2, . . . , 23-N. The lengths and spacings between sections 23-i correspond to those of waveguide sections 22-i, and form reference optical waveguide section 23. The reference beam travel path 45 is terminated by a light beam absorber 47. Through suitable drive mechanisms, such as electromagnetic solenoid drivers, selected ganged pairs of the mirrors 42 and 43 are controllably positioned within beam travel paths 44 and 45 to thereby incrementally or stepwise change the gauge length of the sensor.

FIG. 3 diagrammatically illustrates an electro-thermal mechanism for controllably varying the location of a thermally induced light reflection interface along a section of optical waveguide. In this embodiment, a series of electrically activated thermal elements (e.g., electrically driven thermally conductive strips) 50 are embedded in the surface of a support substrate 55 upon which the optical waveguide section of interest is supported. Like the interferrometric embodiments described above, respective signal path waveguide and the reference path waveguide may identically configured as shown in FIG. 3, so that there are respective sets of spaced apart thermal elements embedded beneath both of the signal and reference arms, each having the same spacing and geometry. As in the previous embodiments, supplying electrical current to selected ganged pairs of the thermal strips will thermally induce reflection interfaces in the beam travel paths through signal and reference waveguide sections, and thereby incrementally or stepwise change the gauge length of the acoustic sensor.

Figure 4:
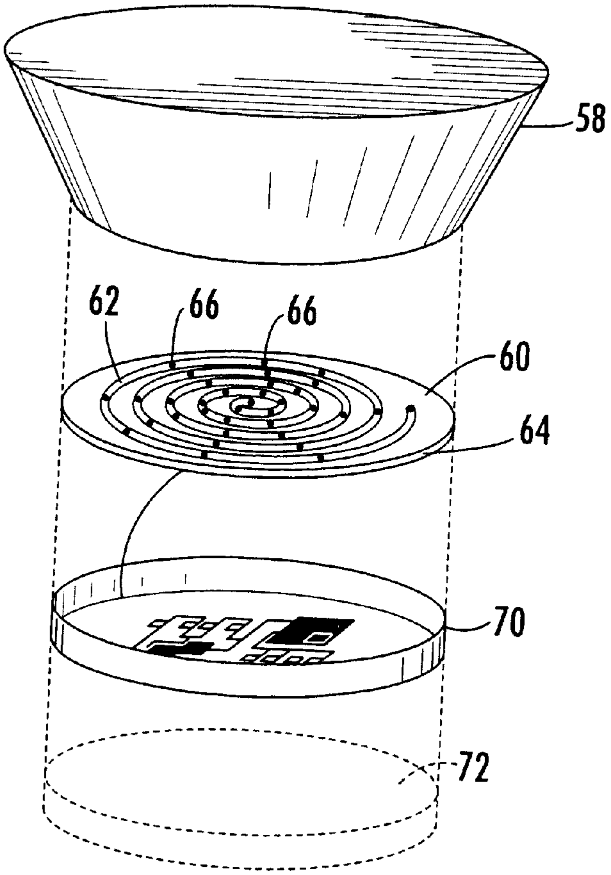
FIG. 4 diagrammatically illustrates a hydrophone that employs the variable gauge length sensor of the invention.

Because of its ability to be tuned in accordance with the strength of the signal being monitored, the present invention has utility in a variety of applications, including 'noisy' environments, such as machinery testing, and passive hydro-kinetic sensors used for very low signal-to-noise ratio applications, such as hydrophone systems that are used to sense very faint/distant acoustic signatures. A non-limiting example of a relatively compact hydrophone architecture that employs the variable gauge length sensor of the invention is diagrammatically illustrated in FIG. 4, as comprising a hydro-acoustic focusing element or horn 58, which provides acoustic coupling gain and directivity of impinging acoustic waves to an optical pressure sensor 62.

The acoustically sensitive region 60 is shown as including a section of acousto optic waveguide 62 having a spiral configuration atop a support substrate 64, and being acoustically coupled with the hydro-acoustic focusing element 58. In an electro-thermally driven interferometric embodiment corresponding to that described above with reference to FIG. 3, a similar spirally configured section of acousto optic waveguide may be supported beneath an electronic module 70, as shown at broken lines 72, which contains opto-electronic signal conversion components and associated signal processing circuitry for controlling the operation of the variable gauge length sensor.

For controlling the gauge length of the sensor, electro-thermally driven strips, shown by the dots 66 in the substrate 64, are dispersed along the spiral paths of the two sections of signal and reference waveguides. As described above, supplying electrical current to selected ganged pairs of the thermal strips for each of the signal and reference optical waveguides causes reflection interfaces to be thermally induced in the beam travel paths through signal and reference waveguide sections thereby incrementally or stepwise changing the gauge length of the hydrophone.

As will be appreciated from the foregoing description, the shortcomings of conventional fixed and pseudo variable sensitivity acoustic sensor architectures are successfully addressed by the variable sensitivity acoustic signal detector of the invention, which has a variable gauge length, that is configured to be controllably and dynamically modified by adjusting the location of a light reflection interface within a section of optical waveguide to which the acoustic stimulus to be sensed is coupled. By changing the position of the light reflection interface to increase the gauge length, the distance over which the refractive index of the waveguide is influenced by the acoustic stimulus is increased, making the sensor more sensitive to small amplitude signals. By decreasing the distance over which the refractive index of the waveguide is affected by the acoustic stimulus, the gauge length and sensitivity of the sensor is decreased, so as to tune the sensor's sensitivity to large amplitude signals.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A variable sensitivity transducer comprising:

an energy transmission medium having a stimulus sensing region coupled to receive a stimulus that affects energy transmitted through said energy transmission medium;

an energy transmission medium modifier which is operative to vary a characteristic of said stimulus sensitivity region and thereby modify energy transmitted through said energy transmission medium; and an energy detector coupled to detect energy transmitted through said energy transmission medium, and generating an output representative of said stimulus coupled to said stimulus sensing region.

2. A variable sensitivity transducer according to claim 1, wherein said energy comprises electromagnetic energy.

3. A variable sensitivity transducer according to claim 1, wherein said energy comprises light energy.

4. A variable sensitivity transducer according to claim 1, wherein said stimulus comprises an acoustic stimulus.

5. A variable sensitivity transducer according to claim 1, an energy transmission medium modifier is operative to vary the size of said stimulus sensitivity region.

6. A variable sensitivity transducer according to claim 1, an energy transmission medium modifier is operative to vary the gauge length of said stimulus sensitivity region.

7. A variable sensitivity transducer according to claim 3, wherein said energy transmission medium comprises an optical waveguide, and wherein said energy transmission medium modifier is operative to induce a light reflection location of said stimulus sensitivity region.

8. A variable sensitivity transducer according to claim 7, wherein said energy transmission medium modifier is operative to apply a controlled thermal input to said optical waveguide.

9. A variable sensitivity transducer according to claim 8, wherein said optical waveguide is configured such that the refractive index of said stimulus sensitivity region its modified in accordance with an acoustic stimulus.

10. A variable sensitivity transducer according to claim 1, wherein said energy transmission medium includes a plurality of energy transmission sections, one of which includes said sensitivity region, and wherein energy transmitted through said plurality of energy transmission sections is coupled to said energy detector, said energy detector being operative to generate said output in accordance with a combination of energy transmitted through said plurality of energy transmission sections.

11. A variable sensitivity transducer according to claim 10, wherein said energy detector is operative to generate said output in accordance with an interferometric combination of energy transmitted through said plurality of energy transmission sections.

12. A method of detecting a stimulus comprising the steps of:

(a) transmitting energy through an energy transmission medium;

(b) coupling said stimulus to said energy transmission medium;

(c) detecting energy transmitted through said energy transmission medium and generating an output representative of said stimulus; and (d) controllably modifying a stimulus sensitivity characteristic of said energy transmission medium.

13. A method according to claim 12, wherein step (b) comprises coupling said stimulus to a stimulus sensitivity region of said energy transmission medium, and wherein step (d) comprises controllably modifying a physical characteristic of said stimulus sensitivity region.

14. A method according to claim 12, wherein said energy comprises electromagnetic energy.

15. A method according to claim 12, wherein said energy comprises light energy, said stimulus comprises an acoustic stimulus, and wherein (d) comprises controllably modifying the gauge length of said stimulus sensitivity region.

16. A method according to claim 15, wherein said energy transmission medium comprises an optical waveguide, and wherein step (d) comprises varying a light reflection location of said stimulus sensitivity region.

17. A method according to claim 16, wherein step (d) comprises applying a controlled thermal input to said optical waveguide, so as to controllably induce a light reflecting interface within said optical waveguide.

18. A method according to claim 17, wherein said optical waveguide is configured such that the refractive index of said stimulus sensitivity region its modified in accordance with acoustic stimulus.

19. A method according to claim 12, wherein said energy transmission medium includes a plurality of energy transmission sections, one of which includes said stimulus sensitivity region that is coupled to receive said stimulus, and wherein step (c) comprises detecting energy transmitted through said plurality of energy transmission sections is coupled to said energy detector, and generating said output in accordance with an interferometric combination of energy transmitted through said plurality of energy transmission sections.

* * * * *